Oct. 1, 1935.   R. C. BENNER ET AL   2,015,778
SILICON CARBIDE REFRACTORY AND THE PROCESS OF MANUFACTURE THEREOF
Filed Oct. 12, 1934
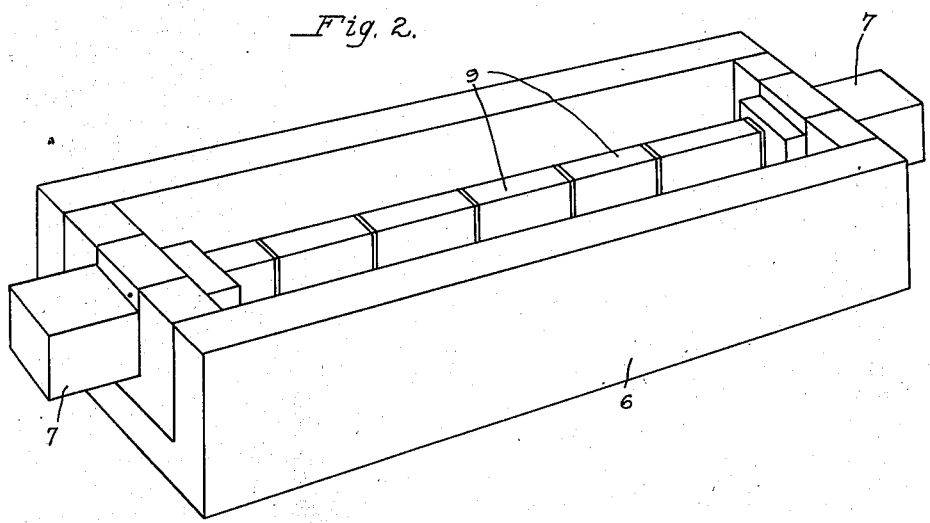
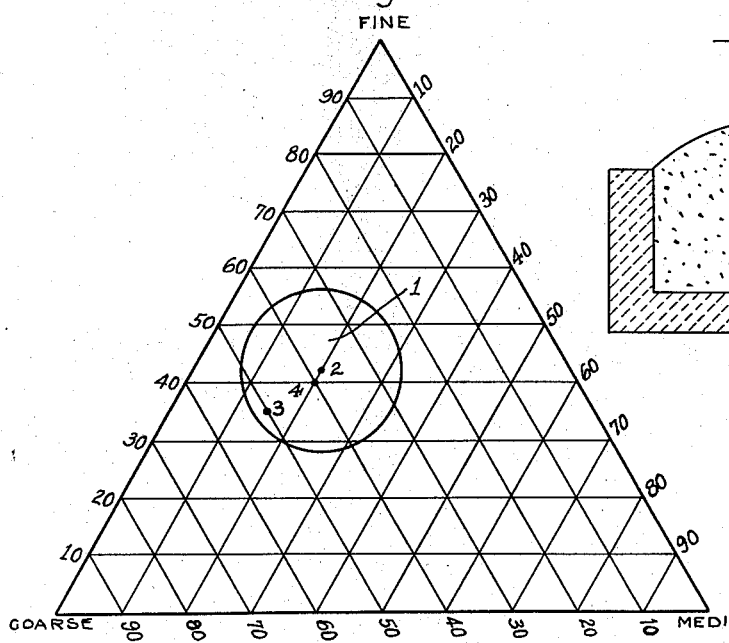
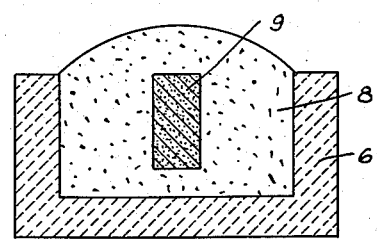
INVENTORS
RAYMOND C. BENNER
GEORGE J. EASTER
JOHN A. BOYER
BY
ATTORNEY.

Patented Oct. 1, 1935

2,015,778

UNITED STATES PATENT OFFICE 2,015,778

SILICON CARBIDE REFRACTORY AND THE PROCESS OF MANUFACTURE THEREOF

Raymond C. Benner, George J. Easter, and John A. Boyer, Niagara Falls, N. Y., assignors to The Carborundum Company, Niagara Falls, N. Y., a corporation of Pennsylvania Application October 12, 1934, Serial No. 748,148

7 Claims. (Cl. 204—62)

This invention relates to improvements in the manufacture of articles composed essentially of silicon carbide, in which the silicon carbide particles are bonded by the process commonly known as recrystallization. This aplication is a continuation in part of our copending application, Serial No. 511,260, filed January 26, 1931.

It is well known in the art that if a suitable mix of silicon carbide grains is molded to shape and then heated to a very high temperature under non-oxidizing conditions, the grains have a tendency to grow together into a strong coherent mass, even when no fusible binding material is present. The resulting product is said to be "recrystallized." Such a material is very highly refractory, owing to the absence of any fusible bonding material. The strength of the recrystallized material at high temperatures is very remarkable, and the brick often has a modulus of rupture in excess of 2,000 pounds per square inch at 1,500 degrees centigrade; however, the product as made by the usual process of manufacture possesses a number of undesirable characteristics, which are largely due to the structure which obtains during the usual process of burning.

In the usual process of manufacture, the articles to be recrystallized are packed in a sand-carbon mix surrounding a core of coke or graphite, an electric current passed through the core, and the entire mixture heated for a prolonged period of time, as for example 24 to 36 hours. The material made according to such a procedure shows a great variation in structure, and while the original mix may be comparatively dense and impermeable, the finished article possesses a comparatively open structure, and may be coarse, honeycombed or striated.

The permeability of the brick is a factor of great importance in connection with the use of the material at high temperatures, since the rate of disintegration under these conditions is dependent upon the permeability of the material to slags and oxidizing gases. The permeability of the usual recrystallized silicon carbide brick is very high, and is so great in comparison with that of the usual bonded refractory that the material cannot be used for many applications where it would otherwise be satisfactory.

In the manufacture of refractories having a fusible bond, the structure of the green or unburned mix is, to a large extent, preserved, and the permeability of the final product is more or less a function of the proportions of the various grit sizes used in the original mix. With recrystallized silicon carbide refractories as made by the usual process, these conditions do not obtain. when a dense and comparatively impermeable mix is subjected to recrystallization, the original structure is not preserved, and the finished article may be as open or permeable as one made from a mix which originally possessed a very high permeability.

In our improved process, we have found that the permeability of a recrystallized silicon carbide brick can be reduced to the same order of magnitude as that obtained with refractories having a fusible bond by limiting the time during which the article is exposed to recrystallizing conditions to a comparatively short interval as, for example, one hour or less. If the article is heated quickly in the proper atmosphere to a sufficiently high temperature, we have found that the process of self bonding by recrystallization takes place almost instantaneously, and a satisfactory bonding of the crystals can be obtained without obtaining the great increase in permeability which results when the process is conducted over a prolonged period of time. As a comparison, the commercial recrystallized brick made by the usual process has a permeability five to ten times as great as the permeability of brick made by our process; furthermore, by controlling the recrystallization process and limiting the time of recrystallization to a comparatively short interval, we are able to preserve, to a large extent, the structure of the unburned article, so that it becomes possible to control the structure of the brick by variations in the original mix.

The permeability of the unburned mix can be controlled within a considerable range by varying the proportions of the various grit sizes comprising the mix. In general, an article made from fine grit material will be less permeable than one having the same percentage of porosity but made from coarser grits. In any case, it is desirable to reduce the pore space to the least possible value, and such a reduction in porosity can be accomplished by using a series of grit sizes and so adjusting the relative proportions of the various sizes so that the solid material will fill the greatest possible proportion of the available space. A method of proportioning the various grit sizes to decrease the amount of pore space in the brick will be further described.

In curing the brick, we have found that by passing the current through the brick itself, the process can be controlled so as to produce rapid recrystallization without an appreciable coarsening of the structure. The passing of the current through the brick eliminates the prolonged heating and cooling periods which are necessary with the usual process where the bricks are packed in a large mass of embedding material surrounding a carbon core. The heating of the brick by passing the current through it permits an accurate control of the time during which the brick is subjected to recrystallizing conditions, and makes possible the shortening of the time of recrystallization to such an extent that a brick having an entirely different structure from that of the usual recrystallized product is produced.

A detailed method of producing a recrystallized brick of low permeability in accordance with our process will be evident from a consideration of the accompanying drawing.

In the drawing:

Figure 1 is a triangular percentage composition diagram showing the proportions of coarse, medium and fine grit fractions which will produce a brick having a minimum amount of pore space;

Figure 2 shows a burning bed which is suitable for recrystallizing silicon carbide brick by the passage of the current through the brick;

Figure 3 shows a sectional view of the burning bed, the section being at right angles to the longitudinal axis of the brick.

For the purpose of producing a refractory of low permeability, a grit mix giving a brick of high apparent density as, for example, 2.3 or greater, is desirable. If the grit mixture consists entirely of particles having substantially the same size, the article will contain a large amount of unoccupied space or voids between the individual particles, even when the particles are packed as closely together as possible. This condition obtains, regardless of whether the particles are coarse or comparatively fine; however, if particles of intermediate size are used to fill the voids between the larger particles, and a definite amount of fine material is used to fill as completely as possible the remaining interstitial space, a product is obtained in which the amount of pore space is greatly decreased.

The amount of pore space in the refractory is dependent upon the ratio of the particle sizes used, and not upon the absolute magnitude of the sizes of the particles. It is possible to secure a dense mix of comparatively coarse or comparatively fine particles, providing the ratio of sizes giving maximum density is preserved.

As an example of a method which may be used for proportioning the particle sizes to give a minimum amount of pore space, the grain is divided into three arbitrary fractions, consisting of coarse, medium and fine particles respectively. The limits of the three fractions are determined so that the coarse particles of one fraction are approximately 2 to 3 times the diameter of the coarse particles in the next succeeding fraction. If the distribution of particle sizes in the various fractions is substantially uniform; that is, if there is no great preponderance of any one particular grit size, the proportions of the three fractions, which will give an article of maximum density, are represented approximately by the area 1 of the diagram shown in Figure 1. This area may be defined by a circle having a radius equal to a twelve and one-half per cent change in composition, and having its center at the point 2, which represents the following composition.

|  | Percent |
|---|---|
| Coarse fraction | 38 |
| Medium fraction | 20 |
| Fine fraction | 42 |

In making the brick, any of the usual methods of molding may be used, although the density of the brick will vary somewhat with the method used for compacting the grain. If the brick is consolidated by a pressure of 2,000 to 5,000 pounds per square inch, the apparent or bulk density of the article made from mixes represented by the circular area 1 will be from 2.3 to 2.5, with a porosity of approximately 22 to 28 per cent, whereas with grit mixes not specially selected with regard to reducing the pore space, the apparent density is usually from 1.8 to 2.1, with a corresponding porosity of approximately 35 to 45 per cent.

In curing the brick by passing the current directly through it, provision should be made for the conduction of the current during the early stages of burning, when the mix is practically a non-conductor. The conductivity of the unburned mix can be somewhat increased by the addition of a small amount of carbon as, for example, 2 to 4 per cent. The excess carbon is converted to silicon carbide during burning. A similar percentage of silicon metal can be added to the mix in place of the carbon, but the bricks show a tendency to crack during burning unless a coating of comparatively high electrical conductivity is provided on the outer surface of the brick, as will be further described.

After the dry ingredients are mixed, a small quantity of temporary binder such as sodium silicate or lignone is added, and the bricks are molded by any suitable means. After the bricks are dried, they are coated with a slip or slurry of sand and carbon, or a more highly conductive coating such as graphite. The outer coating serves to conduct a portion of the current during the initial part of the burning process, and in the case of graphite, the coating also serves to divert a larger portion of the current to the outer portion of the brick.

The standard brick has a comparatively large cross section, and in passing the current through it during the curing process, the inner portions may become heated to a somewhat higher temperature than the outer portions, so that the central portion of the brick may be entirely decomposed to graphite before the outer portions are properly recrystallized. We have found that this phenomenon is more or less dependent upon the conductivity of the mix composing the brick, and is more pronounced in the case of mixes having a comparatively high electrical conductivity. The difficulty can be overcome by the application of a coating of material having a high electrical conductivity such as carbon or graphite, to the outer surface of the brick.

The conductivity of the silicon carbide mix depends, to a large extent, upon the type of grain used in making the refractory. Mixes which are comparatively poorly conducting can usually be burned satisfactorily when coated with a slip or slurry composed of fine sand and carbon, in the proportions of 1 part of silica to 1 part of carbon; however, for a mix having a comparatively high conductivity, a slurry of correspondingly higher conductivity should be applied to the outer portion of the brick. A graphite paste about one quarter of an inch thick applied to the outer surface of the brick will counteract the difficulties arising from local overheating and the decomposition of the central portion of the brick.

Certain mixes have a tendency to crack or split during burning unless a highly conducting slurry or coating is used. This tendency is often pronounced with mixes of comparatively high electrical conductivity, but the difficulty can be completely overcome by the use of the graphite slurry or paste as described.

After the bricks are coated, they are placed in a burning bed of the type shown in Figures 2 and 3, which consists of a refractory trough 6, with electrodes 7 placed at each end of the burning bed for conducting the current to the charge. The bottom of the trough is covered with a sand carbon mix 8 containing approximately 80 per cent silica and 20 per cent carbon. The bricks 9 are then placed on the sand carbon mix in an end to end relationship and are joined to each other and to the electrodes by means of a paste composed of graphite, silicon metal, a small amount of sodium silicate, and water. The remainder of the refractory trough is then filled with the sand carbon mix, and the bricks are covered with approximately two or three inches of the embedding material. The charge is then ready for burning.

The current should be applied gradually at first, but the total time of the process need not greatly exceed one hour. This time includes that necessary to bring the articles to the recrystallizing temperature, so that the actual time during which the articles are exposed to recrystallizing conditions is considerably less than the total burning time. The amount of power required to recrystallize the brick will vary within certain limits, depending upon the amount of embedding material used, the number of bricks placed in series, the conductivity of the mix in comparison with that of the outer coating or slurry, and other similar factors, so that it is not possible to give a single burning schedule that will be applicable to all conditions; however, a suitable schedule can be readily determined by trial. In general, the power should be gradually raised to approximately 12 to 15 kilowatts per brick through a total burning time of approximately 1½ hours. As example, two typical burning schedules, taken from experimental runs, are given below:

Schedule No. 1

5 minutes at 2½ kilowatts per brick
5 minutes at 4 kilowatts per brick
5 minutes at 5 kilowatts per brick
10 minutes at 6 kilowatts per brick
40 minutes at 8 kilowatts per brick
15 minutes at 12 kilowatts per brick The above schedule was found satisfactory for bricks made from poorly conducting grain, and coated with a sand carbon slurry. (4 per cent graphite was added to the mix.)

Schedule No. 2

5 minutes at 3 kilowatts per brick
5 minutes at 5 kilowatts per brick
5 minutes at 6½ kilowatts per brick
15 minutes at 7½ kilowatts per brick
10 minutes at 9 kilowatts per brick
10 minutes at 10 kilowatts per brick
10 minutes at 11 kilowatts per brick
10 minutes at 12½ kilowatts per brick The above schedule was found satisfactory for half size bricks ("soaps", 9 x 2½ x 2¼) made from grain of medium conductivity, coated with ¼" to ⅜" of graphite paste, the grit sizes of the mix composing the brick being proportioned as follows:

|  | Percent |
|---|---|
| 14–36 mesh | 40 |
| 40–70 mesh | 20 |
| 80 and finer | 40 |

(4% graphite was added to the mix.)

Owing to the great change in electrical resistance of the brick during burning, the voltage must be decreased during the burning process in order to maintain the desired power input. In cases where the sand carbon coating is used, an initial voltage of 300 volts per brick may be necessary in order to effect a passage of the current through the charge, whereas the final voltage may be as low as 20 volts per brick. One of the great advantages of the highly conducting graphite coating is that it greatly reduces the initial voltage necessary, and thus eliminates the necessity of extremely high voltage equipment.

The permeability of the brick as made by the process herein described is approximately the same as that of the unburned brick, whereas with the usual commercial product, the permeability is not even of the same order of magnitude as that of the unburned brick. The retention of the permeability of the original mix is shown by the following values, which are actual measurements from several different mixes before and after burning:

| Mix number | Permeability before burning | Permeability after burning |
|---|---|---|
| 1 | 33 | 32 |
| 2 | 33 | 36, 26, 30 |
| 3 | 21 | 27, 26 |

The unit of permeability used in the above table is the volume of air in cubic centimeters per minute which passes through one inch cube of the brick when the difference in pressure between the opposite faces is equal to one inch of water.

The comparative permeabilities of the same mix, when burned by our process and when burned by the usual method, is shown in the following table. The original mixes used were of low porosity and are included in the circular area of Figure 1.

| Mix No. 1 | Unburned | Permeability | |
|---|---|---|---|
|  |  | Rapid recrystallization | Usual process |
| 50% coarse fraction | 33 | 26 | 160 |
| 15% medium fraction | 33 | 30 | 142 |
| 35% fine fraction |  |  |  |
| Mix No. 2 |  |  |  |
| 40% coarse fraction | 21 | 21 | 280 |
| 20% medium fraction | 21 | 26 | 190 |
| 40% fine fraction |  | 30 | 155 |
|  |  | 27 | 214 |

No. 1 mix is designated by the point 3 in Figure 1, while Mix No. 2 is designated by the numeral 4.

It will be observed that even though a mix of low porosity was used in both cases, the low permeability of the original mix was completely lost in the usual burning process. The permeability of the brick burned by the usual process is from 500 to more than 1,000 per cent of that of the bricks made from the same mix but burned by passing the current through them for a controlled period of time.

In the University of Illinois Bulletin, Volume XXIII, No. 50 (August 17, 1926), the permeability of commercial recrystallized silicon carbide brick as measured by the University of Illinois Engineering Experiment Station is given, and the value, when converted to the units used in this specification, is 310. This value is even higher than the values given for comparison in the above table.

One of the advantages of employing a dense grit mixture in combination with a method of burning in which the original structure of the unburned brick is substantially retained, lies in the fact that a brick of low permeability can be obtained from a mix which contains a substantial proportion of coarse particles. This is desirable from the standpoint of strength, resistance to spalling, and other physical characteristics. In addition, the usual "run of mill" grain can be used, providing it is screened into the proper fractions and combined so as to give a mix of high density. As an example, recrystallized bricks having a permeability of from 20 to 30 can be made from a mix having from 40 to 50 per cent of comparatively coarse particles as, for example, particles ranging between 14 and 36 mesh.

Another advantage of our process is that it permits a control of permeability in a recrystallized silicon carbide article, even when it is not desired to reduce the permeability to an absolute minimum. A material composed entirely of silicon carbide and free from the usual bonding agents is characterized by a high degree of chemical stability, especially under highly reducing conditions, where the usual clay bonds are rapidly disintegrated. In certain instances it is even desirable to pass a gas through the refractory article. The methods of controlling the permeability of the unburned brick are well known in the ceramic art, but heretofore this permeability was not preserved upon recrystallization. By the present process it is possible to make an unburned article having practically any desired permeability, and to retain this permeability after the article is recrystallized. Examples of specific mixes, with the permeabilities obtained when the articles were burned by our process, are shown in the following table:

| Mix | Permeability after recrystallization |
|---|---|
| 50% coarse fraction | 46 |
| 20% medium fraction | 43 |
| 30% fine fraction | 52 |
| 60% coarse fraction | 70 |
| 15% medium fraction | 62 |
| 25% fine fraction | 78 |

Permeabilities higher than this value can of course be obtained by using a more permeable or open mix.

The method of measuring the permeabilities given in this specification is essentially that described in the University of Illinois Bulletin, Volume XXIII, No. 50.

The brick to be tested is supported broad face down on an annular felt gasket supporting its outer edge in an iron container, and the space between the sides of the brick and walls of the container is filled with mercury, while the brick is held in position by a weight supported on it in such a way as not to prevent the passage of gas through the face of the brick.

With the brick in this apparatus, air is passed through it from the gasket outward at such a rate that the drop in pressure across the brick amounts to 2 inches of water. The rate of flow is determined by a suitable capillary tube flowmeter inserted in the air line ahead of the brick. The value secured is converted to the amount of air flowing through an inch cube of the brick in one minute when the pressure difference between the faces of the cube is equivalent to one inch of water, and this value is used as the unit of permeability throughout this specification. The permeability thus defined is expressed by the formula $$P = \frac{V \times D}{A \times 2}$$

where
$P$ = the permeability;
$V$ = the air flow in cc. per minute through the brick when the difference in pressure between the faces is 2 inches of water;
$D$ = the thickness of the brick in inches; and
$A$ = the area of the face in square inches.

Although the present process has been described for the manufacture of bricks, it will be realized that the process can be advantageously applied to the manufacture of other refractory shapes such as tile or specially shaped refractory blocks. For most refractory purposes, a low permeability is desired, but there are certain applications which require a more open structure, and in which the pore spaces must be accurately controlled. As an example of a specific use where the control of the pore spaces as herein described is of great advantage, filter plates for hydrofluoric and mixtures of hydrofluoric and nitric acids can be made so that the liquid permeability and average pore size can be accurately and consistently duplicated. The substantial retention of the structure of the unburned mix makes possible a control of pore diameters and permeability within wide limits. Such a control has hitherto not been possible, since the pores in the unburned article did not bear any definite relation to those present in the final recrystallized product.

The scope of our invention may be defined as being within the following claims:

1. A recrystallized silicon carbide refractory composed of self bonded silicon carbide grains and having a permeability of less than 75.

2. A recrystallized silicon carbide refractory composed of self bonded silicon carbide grains and having a permeability of less than 50.

3. A recrystallized silicon carbide refractory composed of self bonded silicon carbide grains and having a permeability of less than 50, the said refractory containing a substantial proportion of particles coarser than 40 mesh.

4. The method of recrystallizing a silicon carbide brick which comprises heating the brick to a temperature sufficient to cause recrystallization, the heat necessary for recrystallization being generated partly by the passage of an electric current through the body of the brick, and partly by the passage of additional current through a conducting material surrounding the said brick, the greater part of the said additional current being localized within a cross sectional area, immediately adjacent to the outer surface of the said brick.

5. The step in the process of recrystallizing a silicon carbide article which comprises surrounding the article with a coating of high electrical conductivity compared to the unburned silicon carbide article, and passing a current through both the article and the said conductive coating for a controlled period of time.

6. The step in the process of recrystallizing a silicon carbide article of large cross section by passing the current through the article, which comprises distributing the current between the inner and outer portions of the article by means of a highly conductive coating applied to the outer surface of the said article.

7. The step in the process of recrystallizing a silicon carbide article which comprises surrounding the article with a graphite coating, and passing an electric current through both the article and the said graphite coating.

RAYMOND C. BENNER.
GEORGE J. EASTER.
JOHN A. BOYER.